United States Patent
Kuzin et al.

(10) Patent No.: US 8,505,083 B2
(45) Date of Patent: Aug. 6, 2013

(54) REMOTE RESOURCES SINGLE SIGN ON

(75) Inventors: Sergey A. Kuzin, Redmond, WA (US); Andrew Eremenko, Redmond, WA (US); Ido Ben Shachar, Kirkland, WA (US); Amjad Hussain, Kirkland, WA (US); James Baker, Sammamish, WA (US); Raymond M. Reskusich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 12/895,727

(22) Filed: Sep. 30, 2010

(65) Prior Publication Data

US 2012/0084570 A1 Apr. 5, 2012

(51) Int. Cl.
H04L 29/06 (2006.01)
(52) U.S. Cl.
USPC .............................................. 726/8; 713/182
(58) Field of Classification Search
USPC .............................................. 726/8; 713/182
See application file for complete search history.

(56) References Cited

U.S. PATENT DOCUMENTS

| | | | |
|---|---|---|---|
| 5,987,523 A | 11/1999 | Hind et al. | |
| 7,146,505 B1 | 12/2006 | Harada et al. | |
| 2004/0098609 A1 | 5/2004 | Bracewell et al. | |
| 2004/0210756 A1 | 10/2004 | Mowers et al. | |
| 2005/0111660 A1* | 5/2005 | Hosoda | 380/44 |
| 2005/0177730 A1 | 8/2005 | Davenport et al. | |
| 2007/0179955 A1* | 8/2007 | Croft et al. | 707/9 |
| 2007/0260738 A1* | 11/2007 | Palekar et al. | 709/229 |
| 2007/0277231 A1 | 11/2007 | Medvinsky et al. | |
| 2008/0151866 A1* | 6/2008 | Wu | 370/352 |
| 2010/0082734 A1* | 4/2010 | Elcock | 709/203 |

OTHER PUBLICATIONS

"Credential Security Support Provider (CredSSP) Protocol Specification", Microsoft Corporation, Jul. 11, 2010, 1-19.
"Windows Authentication", www.technet.microsoft.com-en-us-library-cc755284%28WS.10%29.aspx, Microsoft TechNet, accessed Jul. 26, 2010, 4 pages.

* cited by examiner

*Primary Examiner* — Jung Kim
*Assistant Examiner* — Ayoub Alata
(74) *Attorney, Agent, or Firm* — Woodcock Washburn, LLP

(57) ABSTRACT

Exemplary techniques for enabling single sign-on to an operating system configured to conduct a remote presentation session are disclosed. In an exemplary embodiment, a user credential can be encrypted using an encryption key generated by a remote presentation session server and sent to a client. The client can send the encrypted user credential to the remote presentation session server. The remote presentation session server can decrypt the user credential and use it to log a user into an operating system running on the remote presentation session server. In addition to the foregoing, other techniques are described in the claims, the detailed description, and the figures.

20 Claims, 12 Drawing Sheets

REMOTE RESOURCES SINGLE SIGN ON

BACKGROUND

Virtual machine platforms enable simultaneous execution of multiple guest operating systems on a physical machine by running each operating system within its own virtual machine. One exemplary service that can be offered in a virtual machine is a virtual desktop session. A virtual desktop session is essentially a personal computer environment run within a virtual machine that has its user interface sent to a remote computer. This architecture is similar to a remote desktop environment, however instead of having multiple users simultaneously connect to an operating system, in a virtual desktop session each user has access to their own operating system executing in a virtual machine in a virtual desktop environment.

Single sign-on is a property of access control across related but distinct computer systems. With single sign-on, a user can log in once and gain access to multiple, independent, computer systems. Unlike most of scenarios, where users only need to prove their identity to the server to get access, when accessing a remote presentation session server, i.e., a virtual desktop server or a remote desktop server, user credentials actually need to be sent to the remote presentation session server for validation. This requirement demands severe restrictions on which remote resources the credentials be send to, especially when the credentials are sent without the user's consent, as it is usually the case with single sign-on. Usually a list of such remote resources is regulated by a domain policy and each remote resource has to be authenticated before the credential can be sent to it. In the environment where the set of such remote resources is big and constantly changing, maintaining such a policy becomes a huge burden for administrators. In the cases where remote resources are created for users on the fly maintaining such a policy is impossible.

Accordingly, techniques for allowing a user to single sign-on to a remote presentation session in an environment where servers are dynamically added to a datacenter and/or to simplify the maintenance of such a domain policy are desirable.

SUMMARY

An exemplary embodiment describes a system for effectuating single sign-on for remote presentation sessions. In the illustrated embodiment, the system can include, but is not limited to, a first server configured to encrypt a user credential received from a client with a unique encryption key generated by a second server; and send the encrypted user credential to the client. In this example embodiment, the second sever can be configured to decrypt a copy of the encrypted user credential received from the client; log a user associated with the decrypted copy of the user credential into the operating system; and conduct the remote presentation session with the client. In addition to the foregoing, other techniques are described in the claims, the detailed description, and the figures.

In addition to a system, an exemplary embodiment provides a computer-readable storage medium including executable instructions for effectuating single sign-on for remote presentation sessions. In this example, the computer-readable storage medium includes, but is not limited to, instructions that upon execution cause a processor to generate an encryption key and associate it with a unique identifier; send both the encryption key and the unique identifier to a second server configured to encrypt a copy of the user credential with the encryption key; receive an encrypted copy of the user credential and the unique identifier from a client; decrypt a user associated with the user credential into a virtual desktop session; log a user associated with the user credential into a virtual desktop session; and conduct the virtual desktop session with the client. In addition to the foregoing, other techniques are described in the claims, the detailed description, and the figures.

In yet another example embodiment, a single sign-on method is provided that includes, but is not limited to sending a user credential to a first server; receiving, from the first server, both a network identifier for a second server and an encrypted copy of the user credential encrypted by an encryption key generated by the second server; sending the encrypted copy of the user credential to the network identifier of the second server; receiving a signal indicating that the user credential was verified and used to log a user of the client into a remote presentation session on the second server; and displaying user interface graphics indicative of the remote presentation session. In addition to the foregoing, other techniques are described in the claims, the detailed description, and the figures.

It can be appreciated by one of skill in the art that one or more various aspects described herein may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
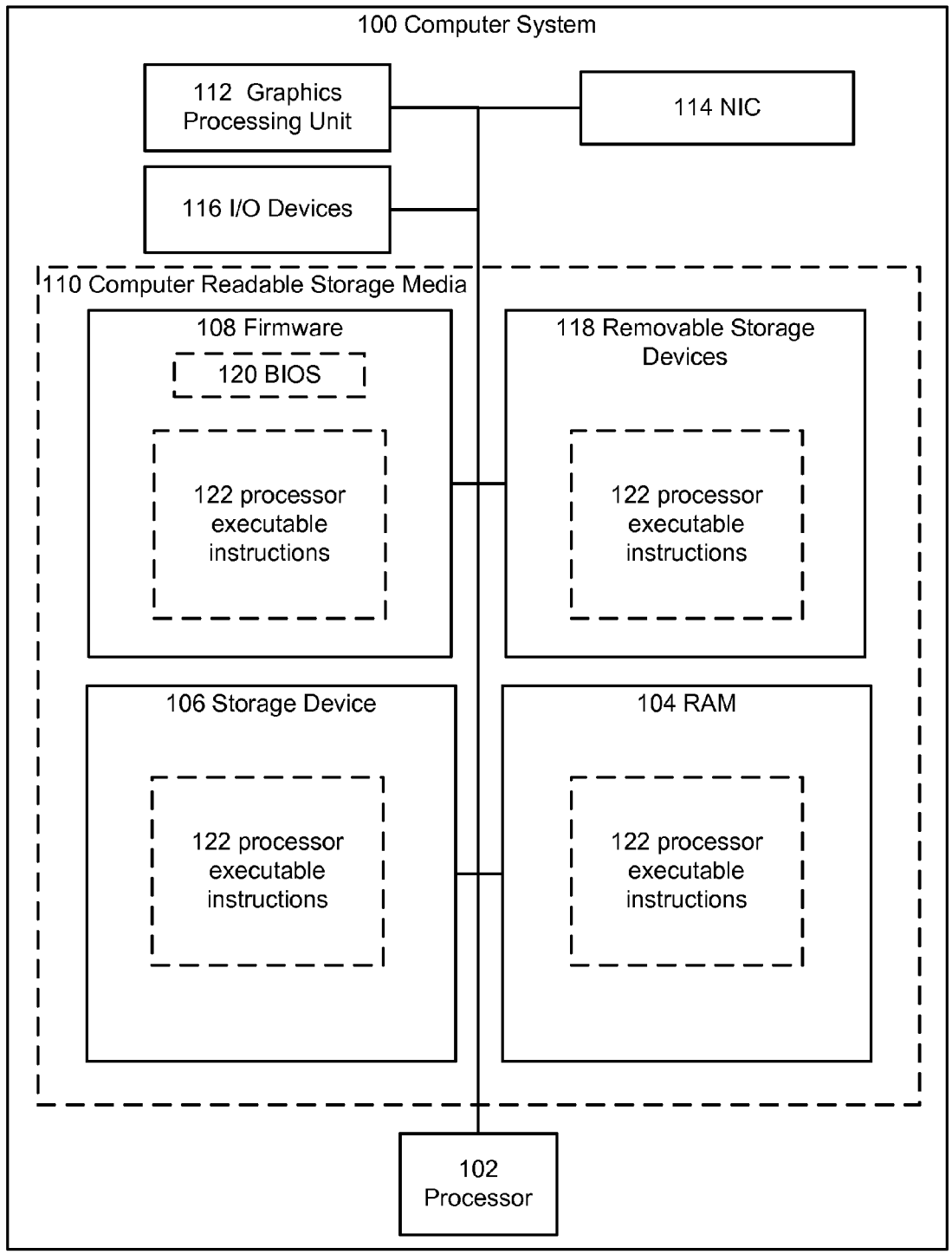
FIG. 1 depicts an example computer system.

The disclosed subject matter may use one or more computer systems. FIG. 1 and the following discussion are intended to provide a brief general description of a suitable computing environment in which the disclosed subject matter may be implemented.

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and a processor, e.g., a core (a unit that reads and executes program instructions) of a multi-core general processing unit, configured by firmware and/or software. Processor(s) can be configured by instructions loaded from memory, e.g., RAM, ROM, firmware, and/or mass storage, embodying logic operable to configure the processor to perform a function(s). In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include processor 102, e.g., an execution core. While one processor 102 is illustrated, in other embodiments computer system 100 may have multiple processors, e.g., multiple execution cores per processor substrate and/or multiple processor substrates that could each have multiple execution cores. As shown by FIG. 1, various computer-readable storage media 110 can be interconnected by one or more system busses which couples various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer-readable storage media can be used such as magnetic cassettes, flash memory cards, and/or digital video disks.

The computer-readable storage media 110 can provide non volatile and volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
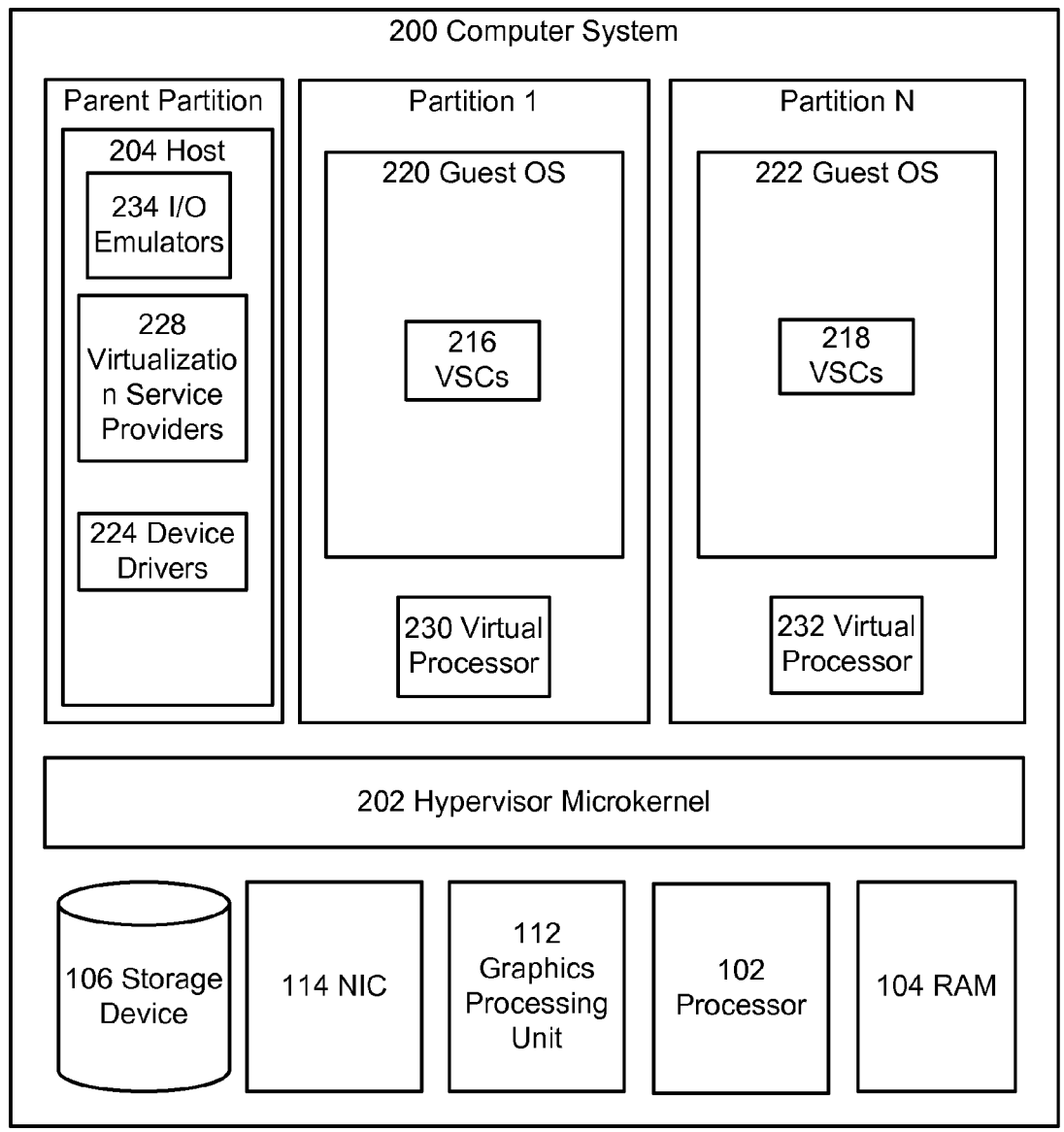
FIG. 2 depicts an operational environment describing an exemplary virtualization platform.

Turning to FIG. 2, illustrated is an exemplary virtual machine server that can be used to generate virtual machines. In this embodiment, hypervisor microkernel 202 can be configured to control and arbitrate access to the hardware of computer system 200. Hypervisor microkernel 202 can isolate processes in one partition from accessing another partition's resources. For example, hypervisor microkernel 202 can generate execution environments called partitions such as child partition 1 through child partition N (where N is an integer greater than 1). In this embodiment, a child partition is the basic unit of isolation supported by hypervisor microkernel 202. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). In this embodiment, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped to a device, microkernel hypervisor 202 can intercept the request and pass the values the guest attempted to write to an associated emulator. The resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
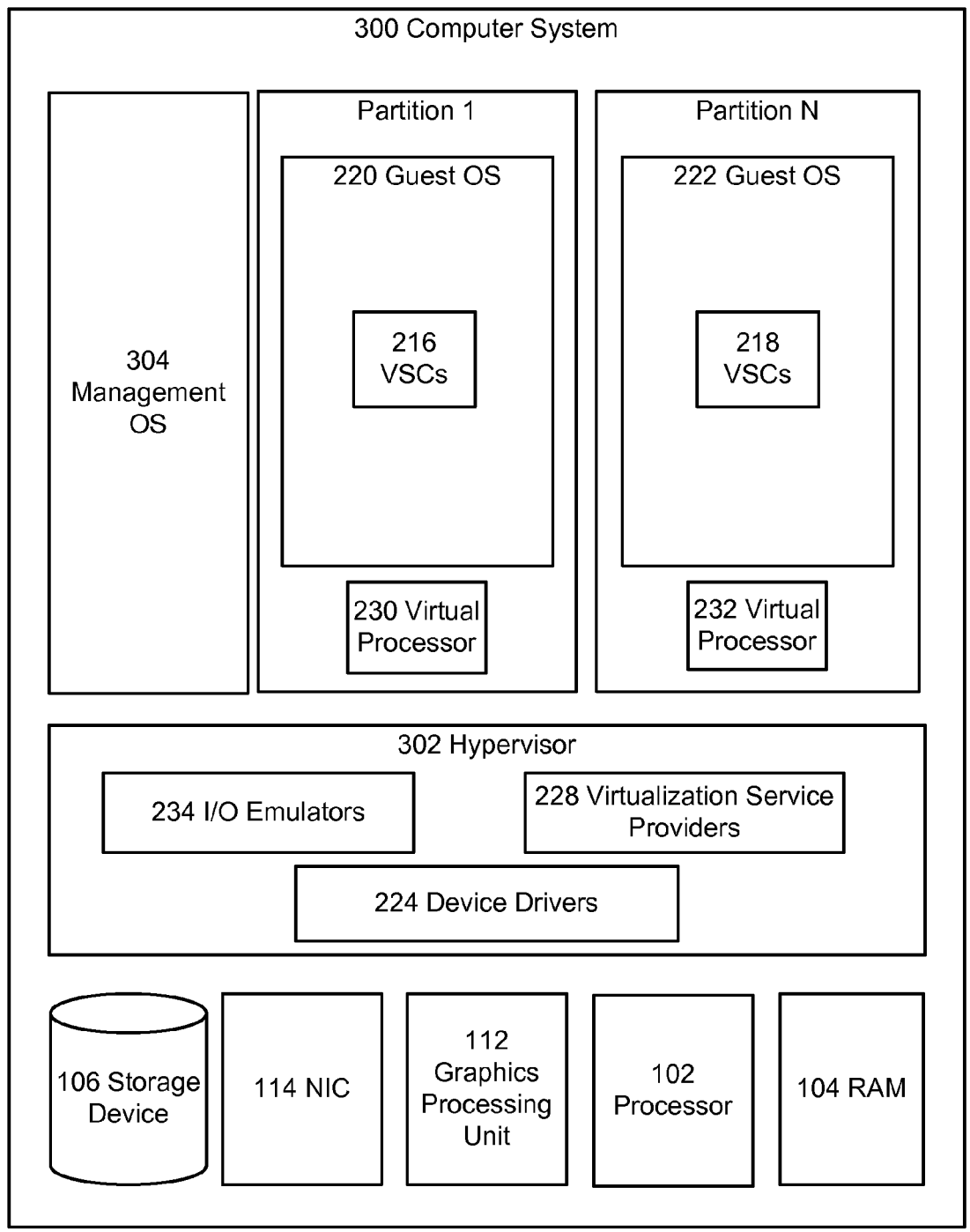
FIG. 3 depicts an operational environment describing an exemplary virtualization platform.

Referring now to FIG. 3, it illustrates a virtual machine server based on an alternative architecture. FIG. 3 depicts similar components to those of FIG. 2; however, in this example embodiment hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
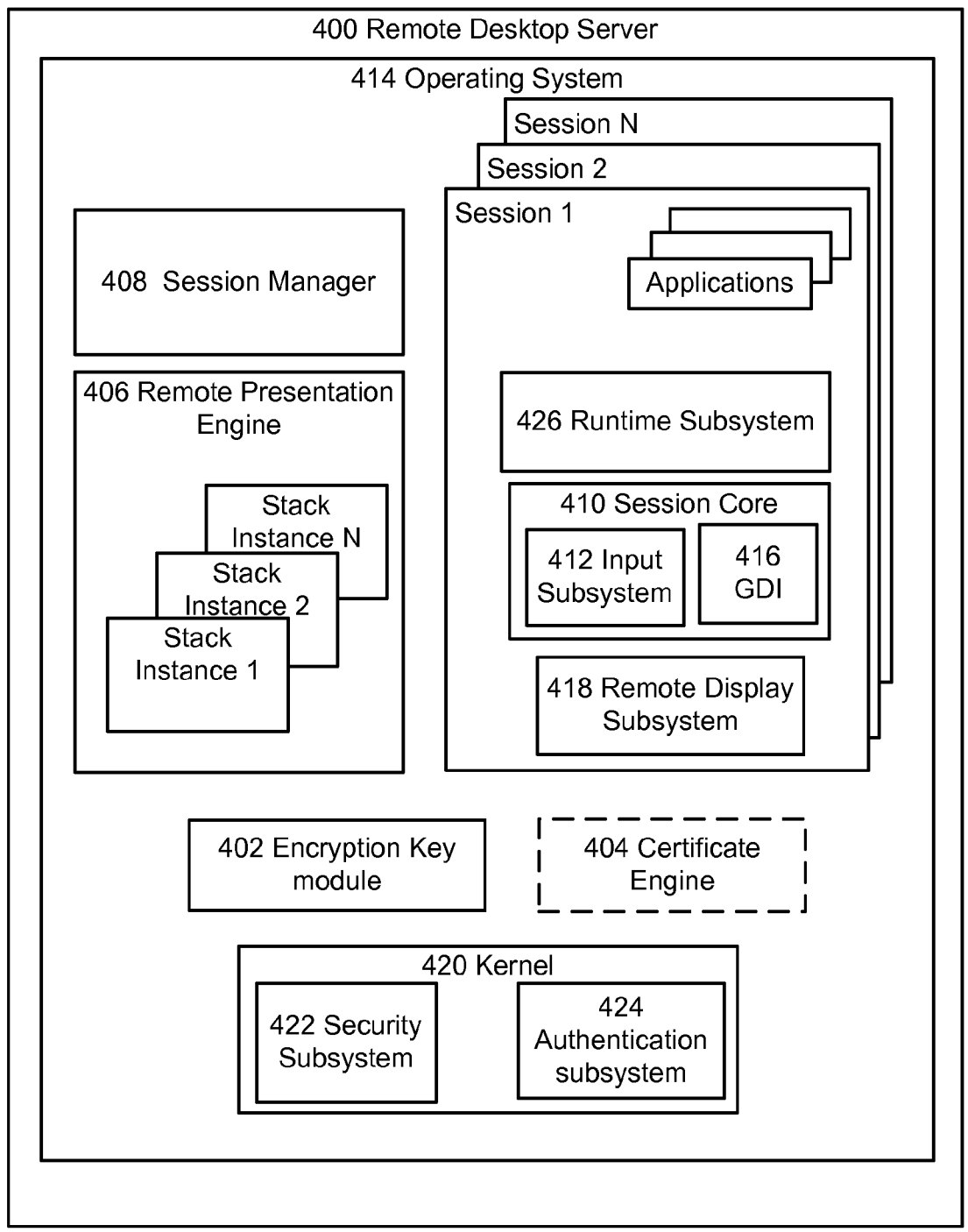
FIG. 4 depicts a high-level block diagram of a remote desktop server.

Referring now to FIG. 4, it generally illustrates a remote desktop server, which can host multiple, simultaneous client sessions. In an exemplary embodiment, single sign-on can be implemented using encryption key module 402 and/or certificate engine 404, which are described in more detail in the following paragraphs. Briefly, remote desktop server 400 can include circuitry configured to effectuate remote desktop sessions for a plurality of clients. In the depicted example, remote desktop server 400 can be configured to generate one or more remote desktop sessions such as sessions 1 through N (where N is an integer greater than 1). Briefly, a remote desktop session can generally include an operational environment for a user to execute applications that are stored on the server. In contrast to a console session, e.g., one where a user is logged into a computer physically located with the user, a remote desktop session can provide a plurality of operating system shells, which can include desktops and other familiar features that modern operating systems offer to a plurality of users. These features are effectuated by a plurality of subsystems, e.g., software code, that interact with kernel 420 of operating system 414. For example, a session can include a subsystem that tracks mouse movement within the desktop, etc.

A session can be generated by remote desktop server 400 on a user by user basis when, for example, remote desktop server 400 receives a connection request over a network connection from a client. A connection request can first be handled by remote presentation engine 406. The remote presentation engine 406 can be configured to listen for connection messages and forward them to session manager 408. Session manager 408 can generate a session for a connecting client by allocating memory to the session and instantiating environment subsystems such as runtime subsystem 426 that can include a kernel mode part such as session core 410, runtime subsystem 426, which can act as an application program interface for applications, etc. As illustrated by FIG. 2, when sessions are generated the remote presentation engine 406 can spawn protocol stack instances for each session. Generally, each protocol stack instance can be configured to route user interface output to an associated client and route user input received from the associated client to the appropriate session core 410.

A user credential, e.g., a username/password combination, can be received by remote presentation engine 406 and passed to session manager 408. Session manager 408 can pass the credential to a logon procedure loaded within the session, which can route the credential to authentication subsystem 424 for verification. Authentication subsystem 424 can generate a system token, which can be used whenever a user attempts to execute a process to determine whether the user has the security credentials to run the process or thread. For example, when a process or thread attempts to gain access, e.g., open, close, delete, and/or modify an object, e.g., a file, setting, or an application, the thread or process can be authenticated by security subsystem 422. Security subsystem 422 can check the system token against an access control list associated with the object and determine whether the thread has permission based on a comparison of information in the system token and the access control list. If security subsystem 422 determines that the thread is authorized then the thread can be allowed to access the object.

Continuing with the description of FIG. 4, in an embodiment the session core 410 can include a graphics display interface 416 (GDI) and input subsystem 412. Input subsystem 412 in an example embodiment can be configured to receive user input from a client via the protocol stack instance associated with the session and transmit the input to session core 410. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 410 and the input subsystem 412 can be configured to determine that an icon is located at the coordinates associated with the double-click. Input subsystem 412 can then be configured to send a notification to runtime subsystem 426 that can execute a process for the application associated with the icon.

Draw commands can be received from applications and/or a desktop and processed by GDI 416. GDI 416 in general can include a process that can generate graphical object draw commands. GDI 416 in this example embodiment can be configured to pass the commands to remote display subsystem 418 that can instantiate a display driver for the session. In an example embodiment remote display subsystem 418 can be configured to include virtual display driver(s) that can be configured to receive the draw commands and transmit them to the client.

Figure 5:
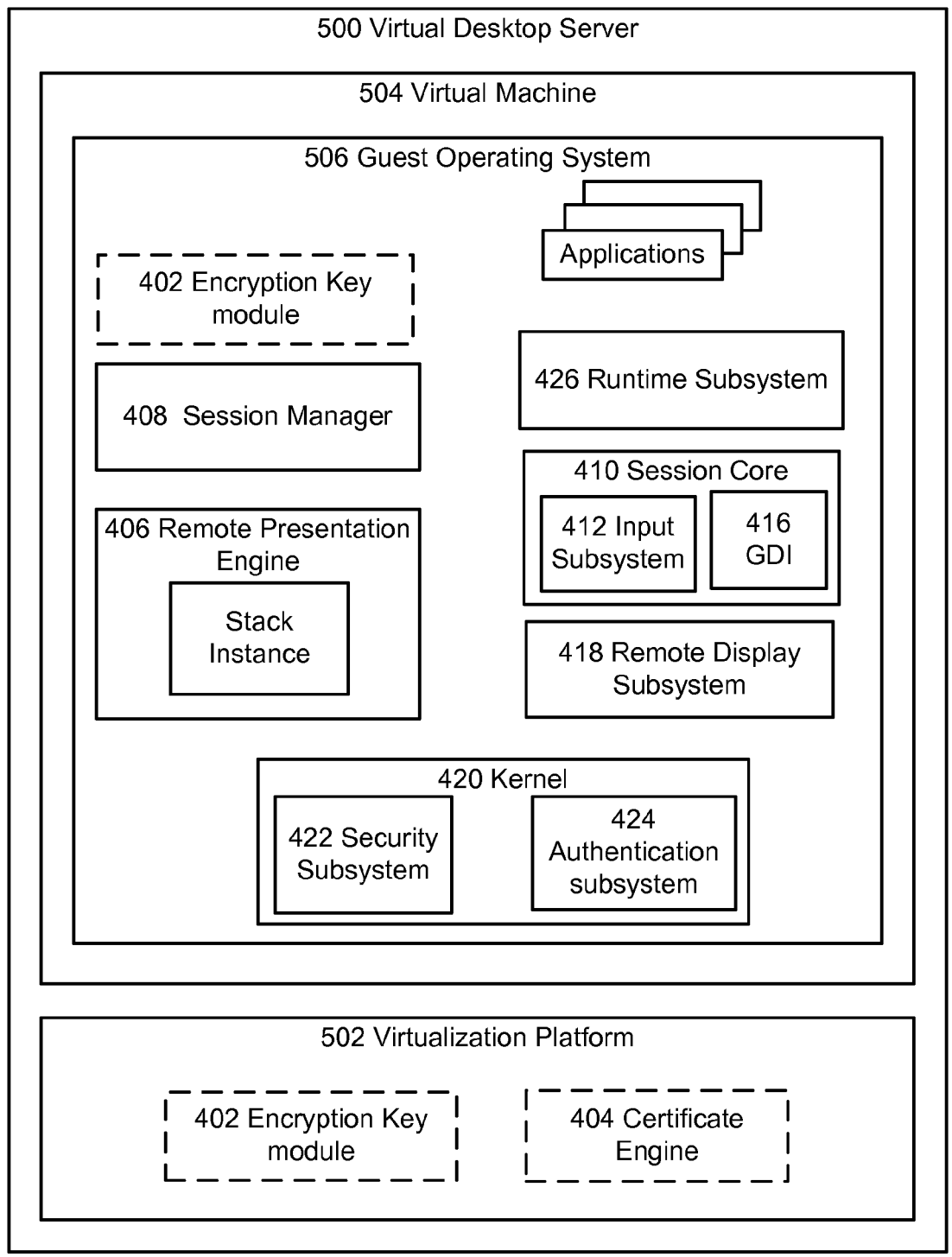
FIG. 5 depicts a high-level block diagram of a virtual desktop server.

Turning to FIG. 5, it illustrates an exemplary virtualization host configured to conduct a plurality of virtual desktop sessions. While one virtual machine is illustrated, virtualization host 500 can simultaneously host many virtual machines. Briefly, virtualization platform 502 is a logical abstraction of virtualization infrastructure components such as those described above in FIG. 2 and FIG. 3. The functionality illustrated and describe as "within" virtualization platform 502, e.g., encryption key module 402 and/or certificate engine 404, can be implemented in one or more of the elements depicted in FIG. 2 or FIG. 3. Also, encryption key module 402 is illustrated in dashed lines and an instance is illustrated within virtualization platform 502 and guest operating system 506. This illustrates that encryption key module 402 can optionally be executed within virtualization platform 502 or an instance can be executed within each guest operating system.

A brief comparison between FIG. 4 and FIG. 5 reveals that the components used to effectuate remote desktop sessions are similar to those used to generate virtual desktop sessions. One major difference between the two types of sessions is that a virtual desktop session is a session conducted between a client and a commodity guest operating system running in a virtual machine. In a virtual desktop session, the operating system is separated from a physical machine and run as a guest operating system. More importantly, a single user is logged into the guest operating system and is in total control of the virtual machine. That is, the user can run as an administrator having full rights on the guest operating system and does not have to compete with other users for operating system resources. A remote desktop session on the other hand, does not provide full control of operating systems to remote users and uses a customized server version of an operating system. A remote desktop session deployment involves configuring a server operating system to allow multiple users to simultaneously logon to the same operating system and use its resources. The remote users are not connected as administrators and compete for operating system resources.

Figure 6:
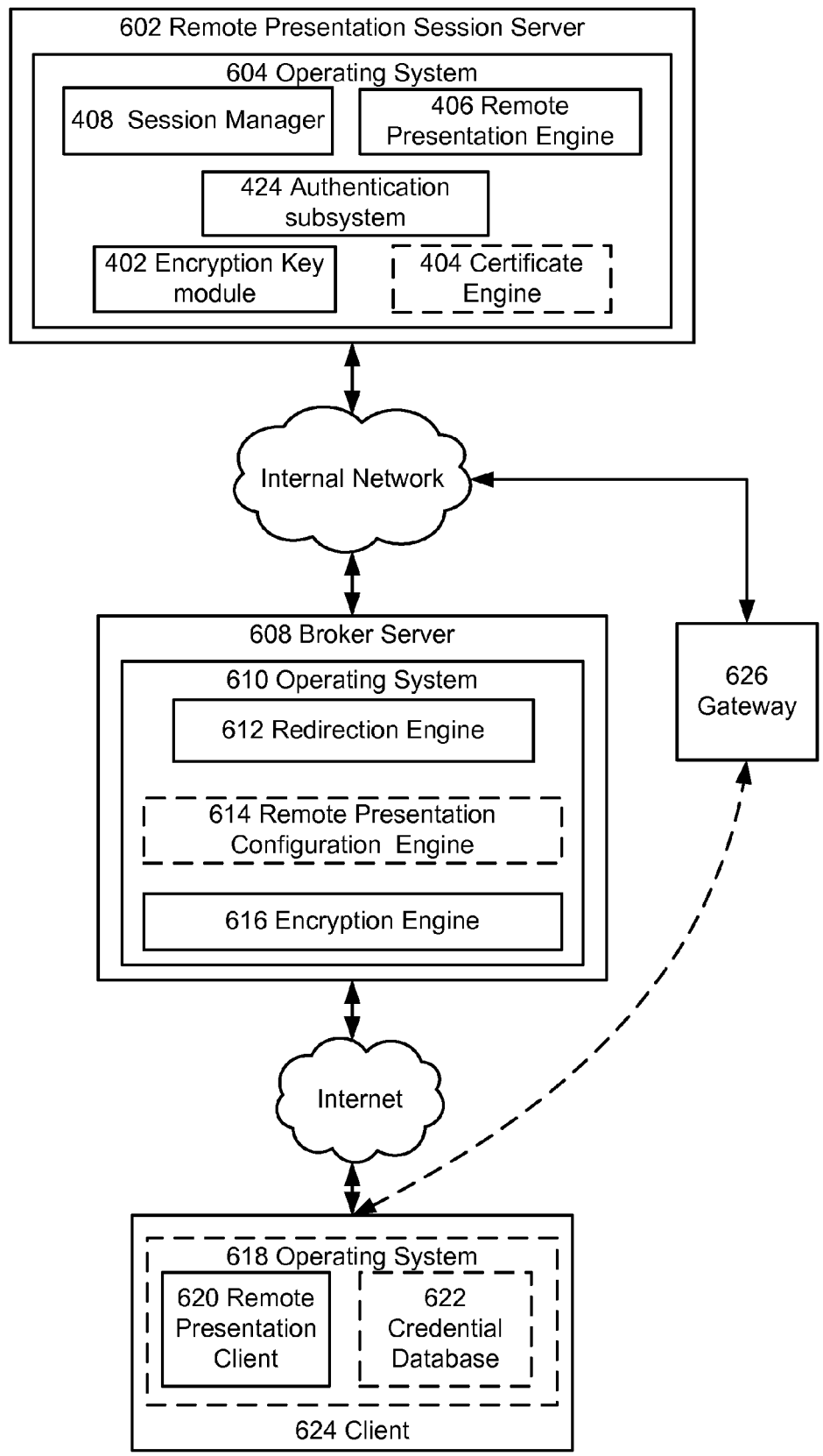
FIG. 6 depicts a high-level block diagram of a datacenter.

Referring now to FIG. 6, it illustrates a high-level block diagram of an exemplary datacenter where single sign-on techniques can be implemented. Briefly, the datacenter includes broker server 608, client 624, gateway 626, and remote presentation session server 602, each of which can include components similar to those described above with respect to claim 1. Remote presentation session server 602 can be configured to conduct remote presentation sessions, e.g., virtual desktop sessions or remote desktop sessions, and can include components similar to those described above with respect to FIG. 4, i.e., remote presentation session server 602 can be configured to deploy remote desktop sessions, or FIG. 5, i.e., remote presentation session server 602 can be configured to deploy virtual desktop sessions. Accordingly, operating system 604 can be guest operating system 506 in an embodiment, or it could be operating system 414 in another embodiment. While one remote presentation session server is illustrated, one skilled in the art can appreciate that a datacenter can have many remote presentation session servers, some of which can be virtual desktop servers and others can be remote desktop servers.

In order to secure the datacenter, remote presentation session servers can be kept off a public network such as the Internet and connecting clients can be routed to the remote presentation session servers after they have been authenticated. Moreover, the remote presentation session servers can be configured to only allow certain types of connections such as certain remote procedure calls (RPC) and remote presentation session connections, e.g., connections for virtual desktop sessions or a remote desktop sessions. This configuration works well to secure computing resources, but it creates a situation where a connecting user has to type his or her password multiple times.

In an exemplary embodiment, broker server 608 can be leveraged to provide a single sign-on experience for client 624. In this exemplary embodiment, single sign-on in the datacenter can allow client 624 to sign on once at broker server 608 and access a virtual desktop session and/or a remote desktop session from remote presentation session server 602 without having to sign in again.

In an embodiment, broker server 608 can act as a point of trust. For example, client 624 can verify the authenticity of broker server 608 and broker server 608 can verify authenticity of the remote presentation session server 602. Thus, client 624 can extend its trust from broker server 608 to remote presentation session server 602 and leverage it to effectuate single sign-on for client 624. For example, client 624 can have a policy that allows it to send user credentials only to the broker server 608. By extending the client's trust from broker server 608 to remote presentation session server 602, client 624 can now send user credentials to remote presentation session server 602 as well. In an exemplary embodiment, a third party certificate authority can be used by client 624 to verify the authenticity of broker server 608. For example, a certificate authority can create a self-signed certificate that includes the name of the certificate authority and a certificate authority public key. The certificate authority can also generate a broker-certificate that contains a public broker key; sign the broker-certificate with the certificate authority's private key; and send the broker-certificate to broker server 608. Meanwhile, client 624 can obtain the self-signed certificate that includes the certificate authority public key.

When client 624 connects to broker server 608, broker server 608 can send a copy of its broker-certificate to client 624. Client 624 can be configured to validate the signature by decrypting the hash associated with the broker-certificate using the certificate authority public key, and comparing it to a hash of the certificate that client 624 calculates. At this point client 624 can be configured to trust that the broker-certificate was really issued by the trusted certificate authority and that it has not been tampered with. However, at this point client 624 can not be configured to trust that broker server 608 is the server that was issued the broker-certificate. For example, some other server could have obtained a copy of the broker-certificate and sent it to client 624.

In order to determine that the broker-certificate actually came from broker server 608, client 624 can generate a random number and encrypt it with the broker server's public key (obtained from the broker-certificate received from broker server 608) and send the encrypted number to broker server 608. If broker server 608 is in fact broker server 608, it can use its private broker server key to decrypt the random number. Broker server 608 can then create a session key from the random number received from client 624; use it to encrypt a predetermined message and send the encrypted message to the client 624. Client 624 can also generate a copy of the session key using the same random number and use it to decrypt the message received from broker server 608. Client 624 can verify the authenticity of the message by comparing it to its own copy of the predetermined message. If the verification is successful, client 624 can be configured to trust that it is communicating with broker server 608.

Since remote presentation session server 602 is not connected to the public network, a different scheme can be used by broker server 608 to authenticate remote presentation session server 602. For example, remote presentation session server 602 can be configured to include remote procedure call stubs for requesting encryption keys and instantiating virtual machines that can host virtual desktop sessions. A remote procedure call allows a client process to issue a request that appears to the process as if it is handled locally. Rather than handing the request on broker server 608, the request is send via a network connection to remote presentation session server 602. Broker server 608 can verify the identity of remote presentation session server 602 using, for example, Kerberos authentication protocol. By verifying identity, broker server 608 can make sure that encryption keys, certificate and other information obtained indeed came from the presentation session server 602.

In exemplary embodiments, the "trust" between client 624 and broker server 608 can be extended to remote presentation session server 602. By extending the "trust" to remote presentation session server 602, user credentials sent to broker server 608 can also be sent to remote presentation session server 602 and a user can be logged into an operating system configured to conduct a remote presentation session without having to prompt a user to provide a user credentials to remote presentation session server. In an exemplary embodiment, an encrypted user credential can be used to extend the "trust" from client 624 to remote presentation session server 602 because remote presentation session server 602 would be able to decrypt it. For example, a user credential can be encrypted using an encryption key generated by the remote presentation session server 602 and sent to client 624 via "trusted" broker server 608. Client 624 can send the encrypted user credential to remote presentation session server 602. In this example, remote presentation session server 602 can authenticate client 624 by decrypting the user credential and using it to log a user into an operating system configured to conduct a remote presentation session.

In an exemplary embodiment, client 624 can start the single sign-on process by sending a credential to broker server 608. In one instance, client 624 can be configured to instruct a user to provide his or her credential by typing it in. Having the user provide the credential in this way is the least secure configuration because malicious software on client 624 could capture the credential while the user is providing it, e.g., while typing it in. In another configuration, the credential can be stored in a credential database 622. For example, credential database 622 can be configured to store credentials along with a relationship to information about resource requesting the credential. For example, if a user stores a credential associated with a website in credential database 622, the information could include the IP address of the website. Credential database 622 can be configured to only expose the credential when a process requests that credential database 622 send the credential to the resource associated with the credential. For example, if client 624 saves the credential along with the name of broker server 608, credential database 622 can be configured to only reveal the credential to when connecting to broker server 608.

After client 624 has been authenticated, redirection engine 612, which can be one or more modules of executable instructions, can run on a processor and select a suitable remote presentation session server for client 624. If the request is for a remote desktop session, redirection engine 612 can search a database that includes network identifiers for remote desktop servers to find a suitable host. Similarly, if the request is for a virtual application or a virtual desktop session, redirection engine 612 can search a database that includes network identifiers for virtualization hosts in the datacenter to find a suitable host to instantiate a virtual machine to host the virtual desktop session.

Broker server 608 can select a suitable host and send a connection request to it. For example, broker server 608 can issue a remote procedure call over a TCP/IP connection to remote presentation session server 602, e.g., virtual desktop server 500. The call can be authenticated by remote presentation session server 602 and broker server 608 can authenticate remote presentation session server 602. After mutual authentication occurs, encryption key module 402 can generate an encryption key and optionally a decryption key (in the instance that the encryption key can not be used for decryption). The encryption key and unique identifier can be sent to broker server 608 via the remote procedure call connection. Encryption key module 402 can also store the unique identifier for the encryption key locally in order to find the key to perform a decryption operation later. Broker server 608 can receive the encryption key and the unique identifier. In this exemplary embodiment, encryption engine 616 running on broker server 608 can encrypt data indicative of the user's credential. Broker server 608 can then send the encrypted data, a network identifier for remote presentation session server 602, and the unique identifier to client 624. In this example, client 624 may not have the network identifier for remote presentation session server 602 before the connection request since servers can be added/removed from the datacenter and broker server 608 may route connection requests to different servers. Of course, while encryption engine 616 is shown running on broker server 608, in an exemplary embodiment an instance of encryption engine 616 can run on each remote presentation session server.

Client 624 can receive both the encrypted user credential and the unique identifier and send both of them via a secure channel established to the remote presentation session server to the network identifier for remote presentation session server 602. Gateway 626 can receive the signal sent from client 624 and can route the encrypted user credential and unique identifier to the remote presentation session server 602. Remote presentation session server 602 can find the key used to decrypt the user credential based on the unique identifier and decrypt the user credential using that key. The decrypted user credential can then be passed to authentication engine 424, which can log a user associated with the user credential into operating system 604, e.g., operating system 414 or guest operating system 506.

In a specific embodiment where encryption key module 402 runs in a guest operating system such as guest operating system 506, virtualization platform 502 can instantiate virtual machine 504 and load guest operating system 506 on a virtual processor when it receives the request to generate the encryption key. Encryption key module 402 can execute and generate the encryption key, which can be passed to virtualization platform 502 and sent to broker server 608. In this example, client 624 can send an encrypted copy of a user credential to virtual machine 504 and encryption key module 402 can decrypt the credential using a decryption key and the unique identifier. In this example, remote presentation session server 602 can pass the decrypted credential to remote presentation engine 406. Remote presentation engine 406 can receive the decrypted user credential and pass it to session manager 408. Session manager 408 can forward the credential to a logon procedure running in, for example, user space of guest operating system 506, which can route the credential to authentication subsystem 424 for authentication. Authentication subsystem 424 can verify the user and start a virtual desktop session.

Continuing with the general overview of FIG. 6, in optional implementations broker server 608 can include remote presentation configuration engine 614 and remote presentation session server 602 can include certificate engine 404. Remote presentation configuration settings are typically requested by the client and are used to configure settings such as autoreconnect, audio redirection, printer redirection, the height and width of the desktop in pixels, customized wallpaper/themes, etc. In an exemplary embodiment, remote presentation configuration engine 614 can be used to enforce certain settings on a per-user basis. In this example, the desired settings can be set by remote presentation configuration engine 614 in accordance with a policy and digitally signed with the encryption key generated by encryption key module 402. For example, the policy can set certain restrictions such as enabling printer redirection during work hours or the like. The polices can be for individual users or set for groups of users. When client 624 connects to remote presentation session server 602, a copy of the encrypted remote presentation configuration settings can be sent to remote presentation session server 602 along with the encrypted user credential. Encryption key module 402 can verify the signature associated with the remote presentation configuration settings and pass the remote presentation configuration settings to session manager 402, which can start the remote presentation session in accordance with the received remote presentation configuration settings.

Certificate engine 404 can be used to allow client 624 to verify the authenticity of resource server 602. For example, certificate engine 404 can be used by remote presentation session server 602 to generate self-signed certificates. That is, the computer system that created the certificate is also signing off on its legitimacy. Self-signed certificates that are not issued by a trusted certificate authority are not typically trusted and will cause warning dialogs to pop-up when client 624 connects. However, in exemplary embodiments these self-signed certificates can be used to authenticate remote presentation session server 602 by leveraging the trust that is established between client 624 and broker server 608. In this example, remote presentation session server 602 could have previously generated a self-signed certificate. Broker server 608 can receive the self-signed certificate, the encryption key, the network identifier for remote presentation session server 602, and the unique identifier associated with the encryption key in this example. Broker server 608 can send the self-signed certificate, an encrypted copy of the user credential encrypted by the encryption key, the network identifier for remote presentation session server 602, and the unique identifier associated with the encryption key to client 624.

Client 624 can connect to remote presentation session server 602 and pass the encrypted user credential along with the unique identifier. Remote presentation session server 602 can pass a copy of the self-signed certificate to client 624. Client 624 can match the self-signed certificate received from remote presentation session server 602 to the copy received from the trusted broker server 608. In the instance the certificates match, client 624 can be configured to accept the identify of remote presentation session server 602 thereby extending the "trust" of broker server 608 to remote presentation session server 602.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 7:
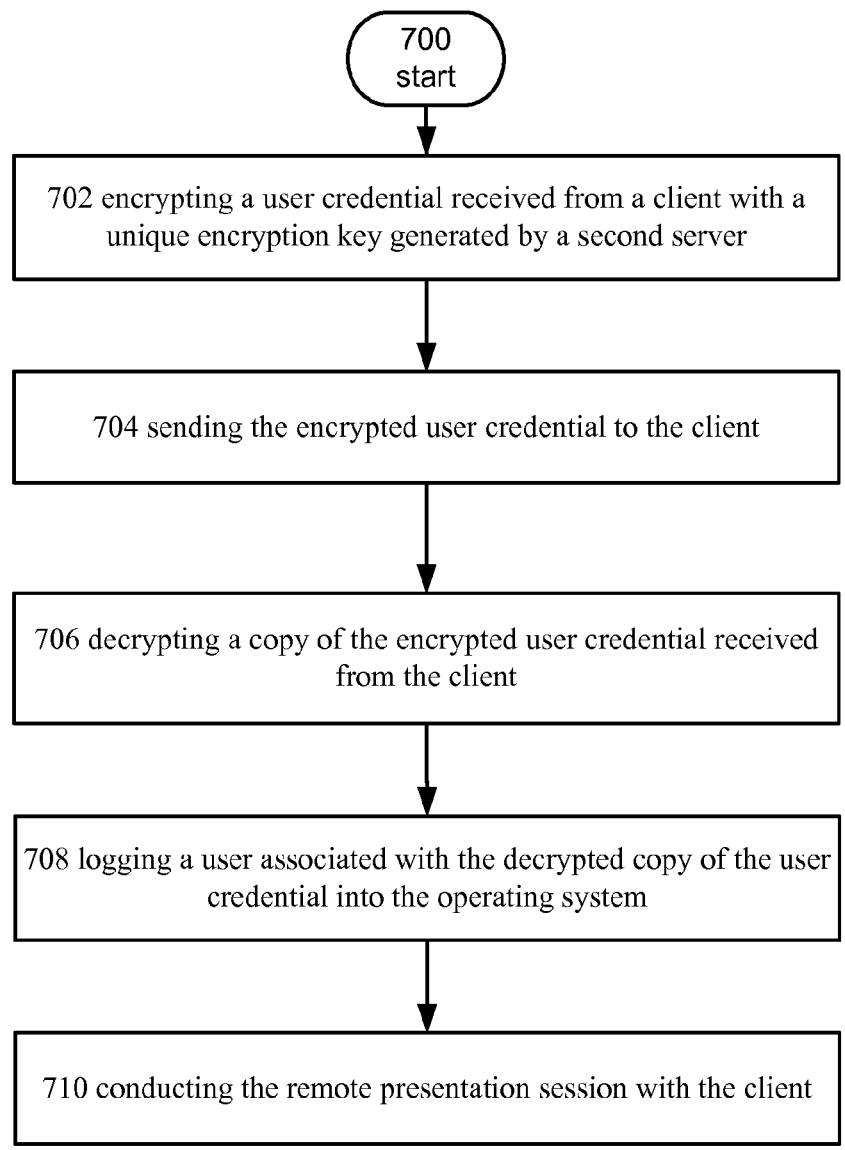
FIG. 7 depicts an operational procedure.

Turning now to FIG. 7, it illustrates an operational procedure including the operations 700-710. Operation 700 begins the operational procedure and operation 702 illustrates encrypting a user credential received from a client with a unique encryption key generated by a second server. For example, and turning to FIG. 6, in an exemplary embodiment a first sever, such as broker server 608, can include circuitry for encrypting a user credential with an encryption key that was generated by a second server, such as remote presentation session server 602. For example, broker server 608 can receive a copy of a user credential from client 624 in a remote presentation session request and receive a copy of a unique encryption key from remote presentation session server 602 (remote desktop server 400 or virtual desktop server 500). Broker server 608 can pass the unique encryption key to encryption engine 616 which can execute on a processor and encrypt the user credential.

In a specific example, and turning to FIG. 4, remote presentation session server 602 could be remote desktop server 400. In this example, client 624 may have sent a username/password combination along with a request for a remote desktop session to broker server 608. Broker server 608 could have forwarded the request to encryption key module 402 running on remote desktop server 400. In this example, encryption key module 402 could generate unique keys. For example, the module could generate a key that is different than keys other remote desktop servers create in the datacenter by using random data and a unique identifier for remote desktop server 400, e.g., a DNS name, machine name, MAC address, etc. Encryption key module 402 can execute on a processor and generate a unique encryption key, optionally a decryption key, and a unique identifier. Remote desktop server 400 can send the encryption key and the unique identifier to broker server 608. Broker server 608 can pass the encryption key to encryption key module 402, which can encrypt a copy of the username/password.

Continuing with the description of FIG. 7, operation 704 shows sending the encrypted user credential to the client. For example, and turning back to FIG. 6, in an exemplary embodiment a network adaptor of broker server 608 can send one or more packets of information indicative of the encrypted credential to client 624. Turning back to the specific example from the previous paragraph, broker server 608 can send the encrypted copy of the username/password, the unique identifier, and a network identifier for connecting to remote desktop server 400 to client 624.

Operation 706 shows decrypting a copy of the encrypted user credential received from the client. For example, and turning back to FIG. 6, remote presentation session server 602 can receive a copy of the encrypted credential from client 624. In this example, remote presentation session server 602 can pass the encrypted credential to an executing instance of encryption key module 402, which can decrypt the credential. Turning back to the specific example from the previous paragraph, client 624 can use the network identifier for connecting to remote desktop server 400 to send one or more packets of information indicative of the encrypted credential and the unique identifier associated with the encryption key to gateway 626. Gateway 626 can include circuitry for determining which remote presentation session server to connect client 624 to and open up a communication channel to remote desktop server 400. Gateway 626 can route the encrypted credential and the identifier for the key pair to remote desktop server 400. Encryption key module 402 can use the unique identifier for the encryption key to locate the a decryption key and decrypt the encrypted credential.

Operation 708 shows logging user associated with the decrypted copy of the user credential into the operating system. Turning back to FIG. 6, an executing instance of authentication subsystem 424 running on operating system 604 can receive the credential and authenticate it. For example, authentication subsystem 424 can query a local database of users to determine if the credential is valid. In the instance the credential is valid, the user credential can be used to log the user into an operating system that is executing an instance of remote presentation engine 406; session manager 408, etc. Turning back to the specific example from the previous paragraph, session manager 408 can pass a copy of the user credential to authentication engine 424, which can validate the credential by checking to see if it is in a directory server. In the instance that the user credential is valid, authentication subsystem 424 can generate a token; pass the token to session manager 408; and start a remote desktop session.

Operation 710 shows conducting the remote presentation session with the client. For example, remote presentation session server 602 can conduct a remote presentation session with client 624. Turning back to FIG. 6, a graphical user interface for the remote desktop session can be streamed by remote presentation engine 406 to client 624 via gateway 626 and user input can be received from client 624 and injected into session core 410 for the remote presentation session.

Figure 8:
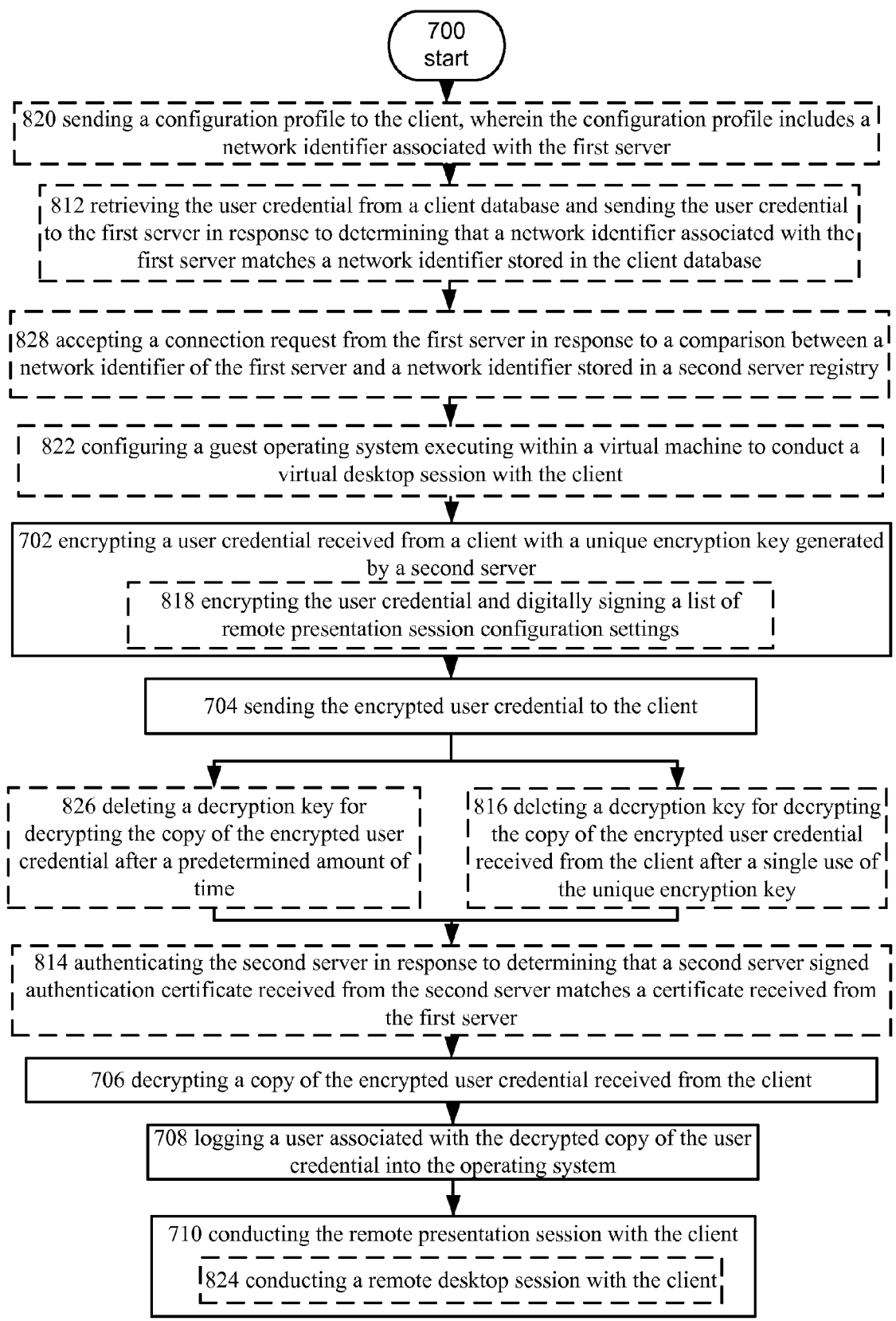
FIG. 8 depicts an alternative embodiment of the operational procedure of FIG. 7.

Referring now to FIG. 8, it illustrates an alternative embodiment of the operational procedure depicted in FIG. 7. The operational procedure depicted in FIG. 8 includes the additional operations/refinements 812-828. Refinement 812 illustrates retrieving the user credential from a client database and sending the user credential to the first server in response to determining that a network identifier associated with the first server matches a network identifier stored in the client database. For example, and turning to FIG. 6, client 624 can include client credential database 622. In this exemplary embodiment, credential database 622 can be configured to a reveal credentials when, for example, the universal resource location (URL) of broker server 608 (and/or a web-server affiliated with broker server 608) matches a URL stored in credential database 622. For example, a user of client 624 may have previously connected and logged into a web-site generated by a web-server that is affiliated with broker server 608. In this example, a web browser may have stored a copy of the user credential used to log into broker server 608 in credential database 622 along with, for example, the IP address of broker server 608, the MAC address of broker server 608, and/or the URL of broker server 608. During a subsequent log in operation, the web browser may issue a request to credential database 622 for a credential that is associated the network identifier and credential database 622 can conduct a search and find a user credential that matches the associated network identifier; and pass the credential to broker server 608 via the web browser and web-server.

Operation 814 shows authenticating the second server in response to determining that a second server signed authentication certificate received from the second server matches a certificate received from the first server. For example, in an embodiment remote presentation session server 602 can be authenticated by using a self-signed certificate and the trust established between broker server 608 and client 624. Turning back to FIG. 6, certificate engine 404 running on remote presentation session server 602 can generate a certificate and sign it. For example, certificate engine 404 can generate a hash of the information in the certificate and encrypt the hash with a private encryption key and embed the encrypted hash in the certificate along with a public decryption key. The certificate can be sent to broker server 608, which can send the certificate to client 624. When client 624 connects to remote presentation session server 602, remote presentation session server 602 can send a copy of the certificate to client 624, which can decrypt the encrypted hashes of both the certificates can compare the certificates. In the instance that the certificates match, client 624 can authenticate remote presentation session server 602.

Turning to operation 816, it shows deleting a decryption key for decrypting the copy of the encrypted user credential received from the client after a single use of the unique encryption key. For example, and referring back to FIG. 6, in an exemplary embodiment the encryption key generated by encryption key module 402 can be deleted after it is used to decrypt the user credential associated with the unique identifier. Or put another way, a unique encryption key can be used for every connection request.

Operation 818 shows encrypting the user credential and digitally signing a list of remote presentation session configuration settings. For example, broker server 608 can digitally sign list of remote presentation session configuration settings with the encryption key used to encrypt the user credential. In this example, broker server 608 can be configured to act as a centralized authority that can enforce remote presentation session configuration settings. In this exemplary embodiment, operating system 610 can include remote presentation configuration engine 614. In response to receiving a connection request from client 624, remote presentation configuration engine 614 can query a database that include remote presentation rules. Remote presentation configuration engine 614 can receive a profile and generate remote presentation session configuration settings that remote presentation session server 602 will honor instead of the configuration settings set by client 624.

Operation 820 shows sending a configuration profile to the client, wherein the configuration profile includes a network identifier associated with the first server. For example, in an embodiment a profile can be pushed to client 624 that configures it to use broker server 608. For example, the policy can be downloaded off a webpage, e.g., a webpage associated with a broker server 608, emailed to client 624, sent in an instant message, or copied from a storage device such as a flash drive. In this exemplary embodiment, the policy can include the URL of a web-server affiliated with broker server 608 and/or broker server 608. A user can run the policy, which can configure remote presentation client 624 to send requests for remote resources to broker server 608 via the web-server and/or directly to broker server 608.

Operation 822 shows configuring a guest operating system executing within a virtual machine to conduct a virtual desktop session with the client. For example, in an embodiment remote presentation session server 602 can be virtual desktop server 500. In this example, virtualization platform 502 can manage virtual machine 504, which can include guest operating system 506. Guest operating system 506 can execute on a virtual processor and schedule remote presentation engine 406 and session manager 408 to run. The virtual processor can then run remote presentation engine 406 and session manager 408, which can configure guest operating system 506 to conduct virtual desktop sessions. Or put another way, the virtual processor can be executed by a processor and the processor can run remote presentation engine 406 and session manager 408. For example, guest operating system 506 can have a firewall opened and be set to listen on a port for incoming connections. Session manager 408 can also have the username added to a list of allowed virtual desktop users; the username added to a list of guest operating system 506 administrators; and remote presentation engine 406 can be configured to listen on a port for incoming virtual desktop session connection requests.

Operation 824 shows conducting a remote desktop session with the client. For example, in this embodiment remote presentation session server 602 can be remote desktop server 400. In this embodiment, a remote desktop session can be started by session manager 408 in response to receiving a connection request via remote presentation engine 406. Remote presentation engine 406 can receive user input over the network from client 624 and inject the input into the session. Remote display subsystem 418 can execute and capture a graphical user interface for the session and send it to client 624. For example, a bitmap indicative of a desktop can be generated in memory and a render command can be issued. Remote display subsystem 418 can copy the bitmap and send it to remote presentation engine 406, which can send it via one or more packets to gateway 626. Gateway 626 can receive the packets indicative of the bitmap and stream one or more packets of information indicative of the bitmap to client 624.

Operation 826 illustrates deleting a decryption key for decrypting the copy of the encrypted user credential after a predetermined amount of time. For example, in an embodiment encryption key module 402 can be configured to delete an decryption key after a predetermine amount of time has expired. That is, the encryption key can be deleted if it is also used in decryption operations or a unique decryption key can be deleted if it is used in decryption operations. This ensures that client 624 can single sign-on for a limited period of time after the encrypted user credential is received from broker server 608. For example, if client 624 lost network connectivity after it received the encrypted user credential and reestablishes connection after the predetermined amount of time has elapsed, remote presentation session server 602 would not be able to decrypt the user credential and the user would not be able to sign in without entering her or his credential again.

Operation 828 illustrates accepting a connection request from the first server in response to a comparison between a network identifier of the first server and a network identifier stored in a second server registry. For example, in an embodiment remote presentation session server 602 can be configured to only accept incoming connection requests from broker servers that have a network identifier, e.g., a DNS name, that matches a network identifier stored in a registry on remote presentation session server 602. This ensures that remote presentation session server 602 will only accept connection requests from remote presentation session servers that have been pre-approved. For example, an administrator could log into remote presentation session server 602 when he or she is configuring the datacenter and set a registry key associated with accepting incoming connection requests from broker server 608. Similar to that described above, the network identifier could be a machine name, or any other identifier that uniquely identifies broker server 608 on internal network.

In addition to remote presentation session server 602 authenticating broker server 608, broker server 608 can authenticate remote presentation session server 602. In an exemplary embodiment, broker server 608 can use the Kerberos protocol to authenticate remote presentation session server 602. After remote presentation session server 602 is authenticated, broker server 608 can be configured to accept the encryption key and/or a digital certificate.

Figure 9:
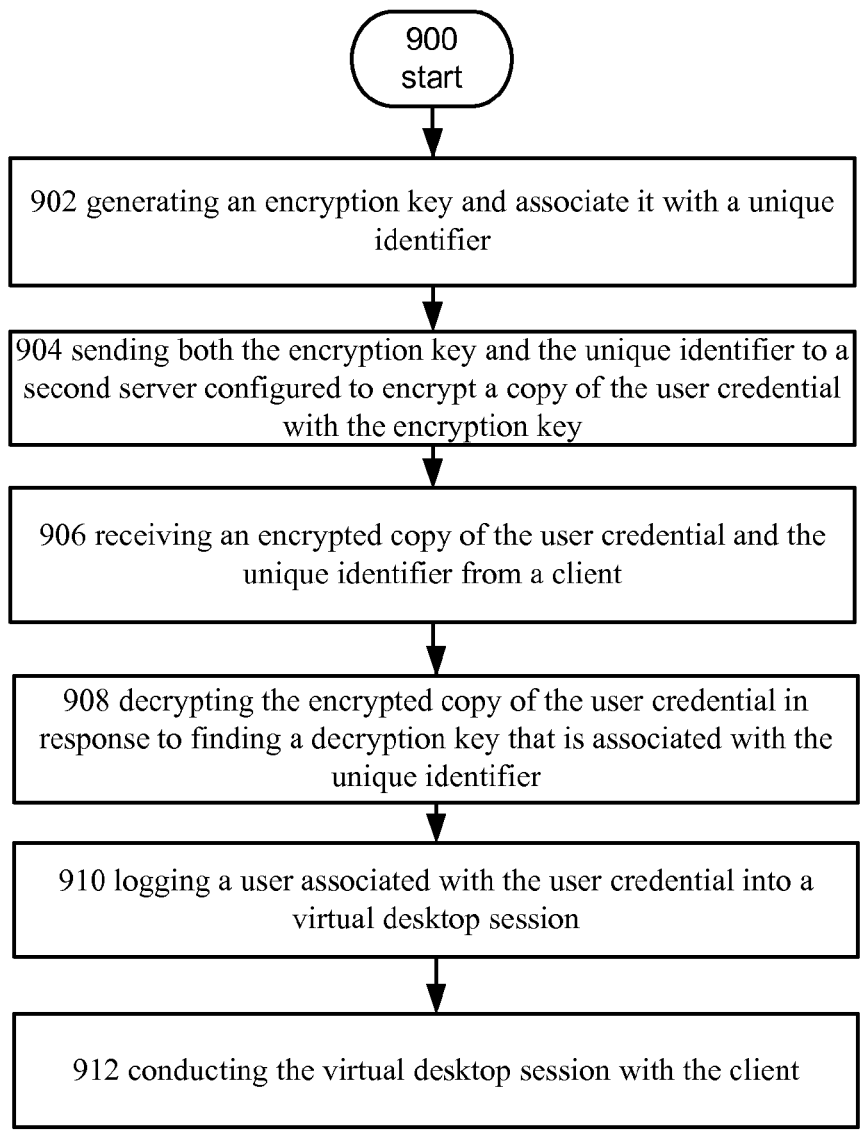
FIG. 9 depicts an operational procedure.

Referring now to FIG. 9, it illustrates an operational procedure for enabling single sign-on to remote presentation session servers including operations 900, 902, 904, 906, 908, 910, and 912. Operation 900 begins the operational procedure and operation 902 shows generating an encryption key and associate it with a unique identifier. For example, and turning to FIG. 5, virtualization platform 502 can include encryption key module 402. For example, encryption key module 402 could be effectuated within host 204 of FIG. 2. In this example, encryption key module 402 can execute on a processor and generate an encryption key. In this exemplary embodiment, the encryption key can be used in a single encryption operation and then it can be destroyed. Or put another way, encryption key module 402 can generate a unique encryption key for every connection request.

Continuing with the description of FIG. 9, operation 904 illustrates sending both the encryption key and the unique identifier to a second server configured to encrypt a copy of the user credential with the encryption key. Turning to FIG. 6, in this exemplary embodiment remote presentation session server can represent virtual desktop server 500 of FIG. 5. In this example, a network adaptor of virtual desktop server 500 can transmit one or more packets indicative of both the one-time-use encryption key and a unique identifier to broker server 608. In a specific example, virtual desktop server 500 can issue a remote procedure call to broker server 608. In this example, both virtual desktop server 500 and broker server 608 can be configured to implement remote procedure calls over an TCP/IP connection. That is, virtual desktop server 500 can run an RPC key passing stub process and broker server 608 can run a corresponding RPC key receiving stub process. In this example, when encryption key module 402 generates the one-time-use encryption key it can invoke the RPC key passing stub process and pass it the one-time-use encryption key and the unique identifier. The RPC key passing stub process can open a TCP/IP connection to broker server 608 and send RPC key receiving stub process the one-time-use encryption key and the unique identifier. The RPC key receiving stub process can validate RPC key passing stub process and retrieve the one-time-use encryption key and the unique identifier from a network buffer and pass it to, for example, encryption engine 616.

Continuing with the description of FIG. 9, operation 906 illustrates receiving an encrypted copy of the user credential and the unique identifier from a client. For example, virtual desktop server 500 can receive a copy of the encrypted credential from client 624. In this example, broker server 608 could have previously encrypted the user credential and sent it to client 624.

Operation 908 shows decrypting the encrypted copy of the user credential in response to finding a decryption key that is associated with the unique identifier. Turing back to FIG. 6, in an example embodiment encryption key module 402 can decrypt the encrypted copy of the user credential. For example, encryption key module 402 can receive the unique identifier and the encrypted user credential and search a database for the unique identifier. If a match is found, encryption key module 402 can retrieve the decryption key that is associated with the unique identifier in the database and use it to decrypt the user credential. After the decryption operation is complete, virtual desktop server 500 has a user credential that can be used to log client 624 into a virtual desktop session without prompting the user a second time for his or her user credential.

Operation 910 shows logging a user associated with the user credential into a virtual desktop session. Turning back to FIG. 6, virtualization platform 402 can send the decrypted user credential to an executing instance of authentication subsystem 424 running in guest operating system 506. In this example, authentication subsystem 424 can receive the decrypted user credential and log the user into a virtual desktop session. For example, authentication subsystem 424 can query a local database of users to determine if the credential is valid. For example authentication subsystem 424 can check to see if the credential is on a list of approved virtual desktop users and/or check to see if the credential is in a directory server. In the instance the credential is valid, the user credential can be used to log the user into guest operating system 506.

Operation 912 shows conducting the virtual desktop session with the client. For example, remote presentation engine 406 can receive user input over the network from client 624 and inject user input from client 624 into the guest operating system 506. Remote presentation engine 406 can also capture a graphical user interface for guest operating system 506 and send it to client 624. Remote display subsystem 418 can execute and capture a graphical user interface for the session and send it to client 624. For example, a bitmap indicative of a desktop can be generated in memory and a render command can be issued. Remote display subsystem 418 can copy the bitmap and send it to remote presentation engine 406, which can send it via one or more packets to gateway 626. Gateway 626 can receive the packets indicative of the bitmap and stream one or more packets of information indicative of the bitmap to client 624.

Figure 10:
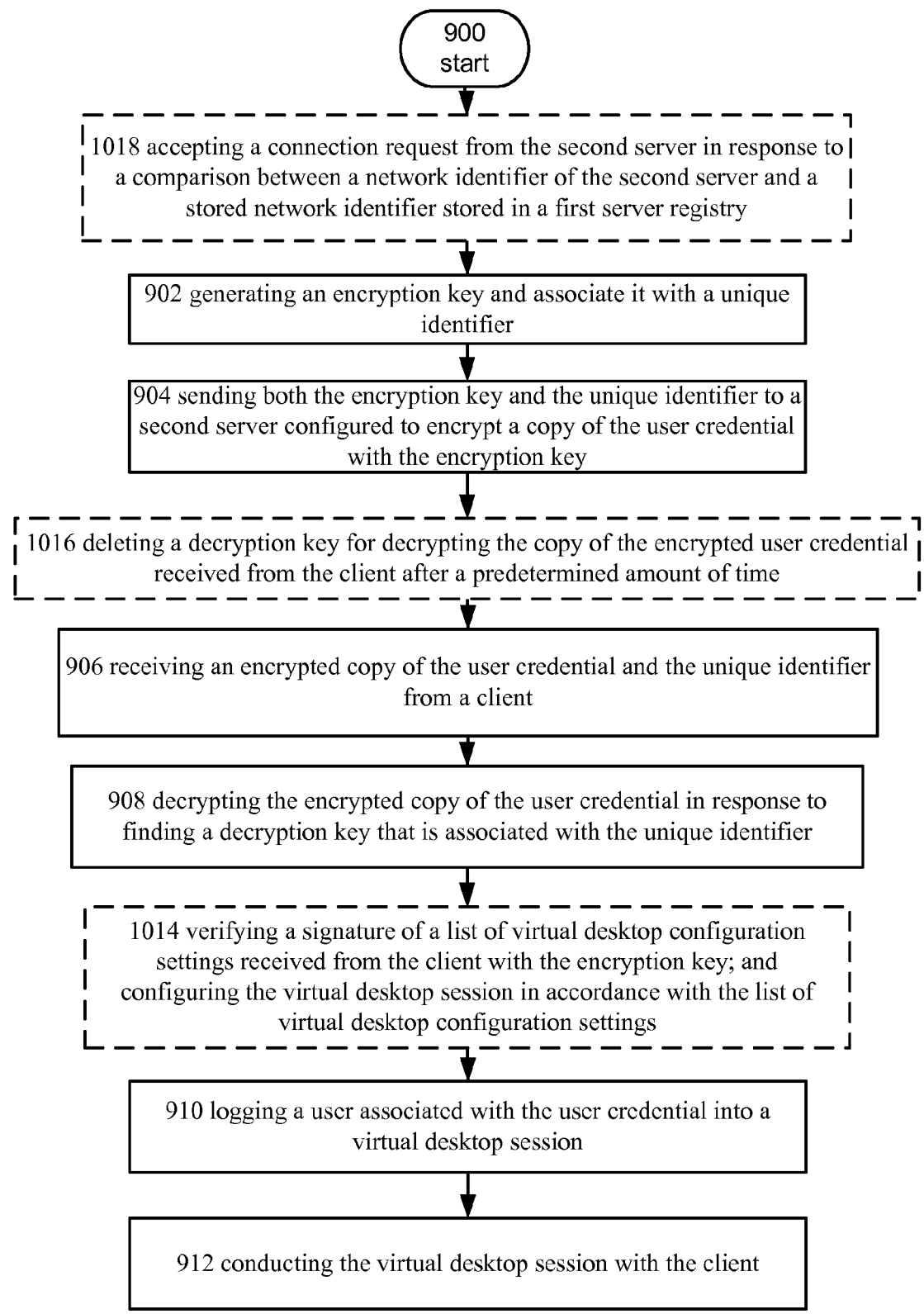
FIG. 10 depicts an alternative embodiment of the operational procedure of FIG. 9.

Referring now to FIG. 10, it illustrates an alternative embodiment of the operational procedure of FIG. 10 including additional operations 1014-1018. Operation 1014 shows verifying a signature of a list of virtual desktop configuration settings received from the client with the encryption key; and configuring the virtual desktop session in accordance with the list of virtual desktop configuration settings. For example, broker server 608 could have previously signed a list of remote presentation session configuration settings with the encryption key in addition to encrypting the user credential. Virtualization platform 502 in this exemplary embodiment can be configured to enforce broker server set remote presentation settings. In this example, encryption key module 402 can verify the signature and pass them to a virtual desktop manager module that runs within virtualization platform 502. Session manager 408 can process the settings and setup a virtual desktop session in accordance with the decrypted settings. For example, session manager 408 can turn off printer redirection, set a resolution of remote display subsystem 418, etc.

Referring to operation 1016, it shows deleting a decryption key for decrypting the copy of the encrypted user credential received from the client after a predetermined amount of time. For example, in an embodiment encryption key module 402 can be configured to delete the decryption key associated with the unique identifier after a predetermine amount of time has expired. This ensures that client 624 can single sign-on for a limited period of time.

Turning to operation 1018, it shows accepting a connection request from the second server in response to a comparison between a network identifier of the second server and a stored network identifier stored in a first server registry. For example, in an embodiment virtual desktop server 500 can be configured to accept incoming connection requests from broker servers that have a network identifier that matches a network identifier stored in a registry on virtual desktop server 500.

In addition to remote presentation session server 602 authenticating broker server 608, broker server 608 can authenticate remote presentation session server 602. In an exemplary embodiment, broker server 608 can use the Kerberos protocol to authenticate remote presentation session server 602. After remote presentation session server 602 is authenticated, broker server 608 can be configured to accept the encryption key and/or a digital certificate.

Figure 11:
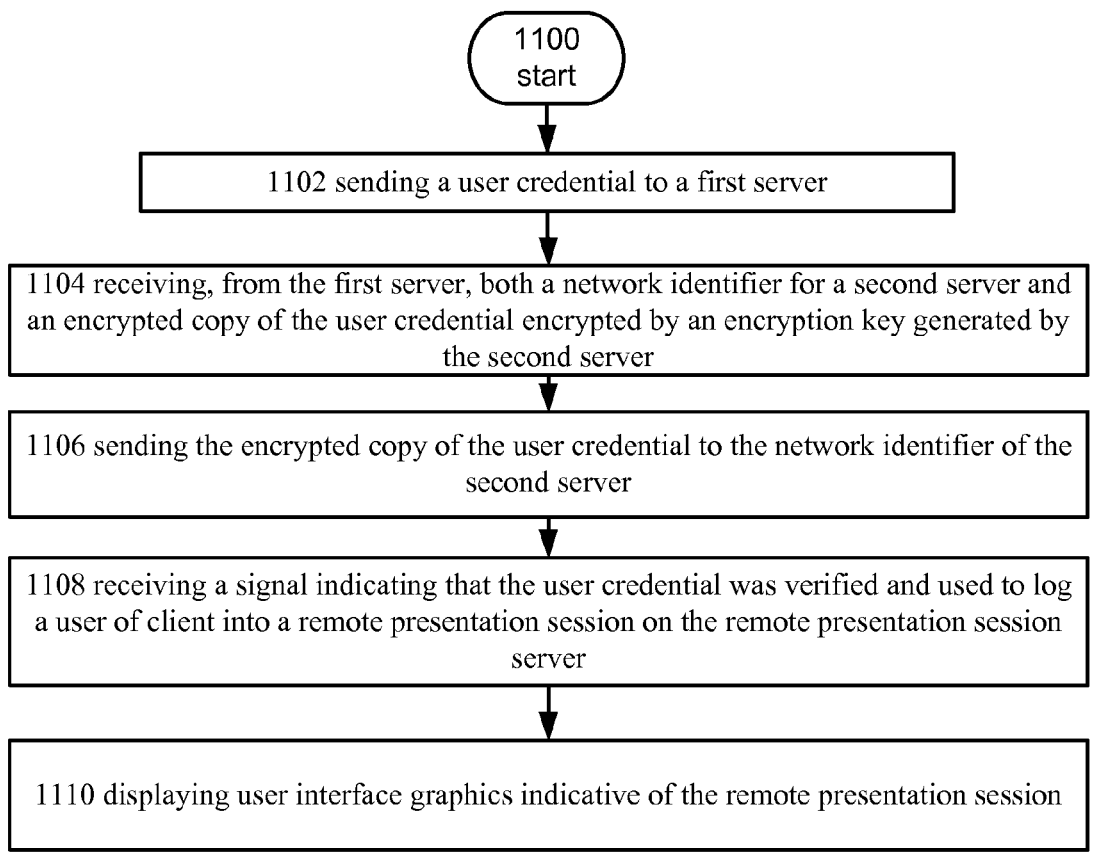
FIG. 11 depicts an operational procedure.

Referring now to FIG. 11, it illustrates an operational procedure including operations 1100, 1102, 1104, 1106, 1108, and 1110. Operation 1100 begins the operational procedure and operation 1102 shows sending a user credential to a first server. For example, client 624 can display, for example, an icon that can be selected and cause a processor to execute instructions for sending a request to broker server 608 for a remote presentation session, e.g., a remote desktop session or a virtual desktop session. Broker server 608 can receive a copy of a user credential from client 624. For example, one or more packets indicative of the user credential can be sent from client 624 to broker server 608 via the Internet.

Continuing with the description of FIG. 11, operation 1104 shows receiving, from the first server, both a network identifier for a second server and an encrypted copy of the user credential encrypted by an encryption key generated by the second server. For example, client 624 can receive an encrypted user credential, a unique identifier, and a network identifier for remote presentation session server 602 from broker server 608 in a redirection packet. The processor in client 624 can execute instructions that process the redirection packet and cause client 624 to send a connection request to remote presentation session server 602 In this example, trust has to be established between remote presentation session server 602 and client 624 otherwise remote presentation session server 602 will prompt the user for a user credential upon connection. In this exemplary embodiment, the encrypted user credential can be used to establish trust.

Continuing with the description of FIG. 11, operation 1106 shows sending the encrypted copy of the user credential to the network identifier of the second server. For example, client 624 can be redirected to gateway 626. Gateway 626 can include executable instructions for determining that the network identifier is associated with remote presentation session server 602 and gateway 626 can open up a communication channel to remote presentation session server 602. Gateway 626 can then route a copy of the encrypted user credential to remote presentation session server 602.

Turning now to operation 1108, it shows receiving a signal indicating that the user credential was verified and used to log a user of the client into a remote presentation session on the second server. Turning back to FIG. 6, client 624 can receive a signal indicating that the user credential was verified and used to log into operating system 604, e.g., operating system 414 or guest operating system 506. For example, remote presentation client 620 can receive one or more packets indicative of a graphical user interface that shows a logon screen displaying text indicating that the operating system is logging the user in or the signal indicating that the user credential was verified could be displaying the desktop of operating system 604. The logon screen can indicate that the user credential was validated and remote presentation client 620 can display the graphics on a local display. Behind the scene, an executing instance of encryption key module 402 can decrypt the encrypted user credential and passed it to authentication subsystem 424 for authentication. Authentication subsystem 424 can determine that the credential is valid and log the user into operating system 604.

Turning now to operation 1110, it shows displaying user interface graphics indicative of the remote presentation session. For example, remote presentation session server 602 can conduct a remote presentation session with client 624. Turning back to FIG. 4 or 5, a graphical user interface for the remote presentation session can be streamed by remote presentation engine 406 to client 624 via gateway 626 and user input can be received from client 624 and injected into session core 410.

Figure 12:
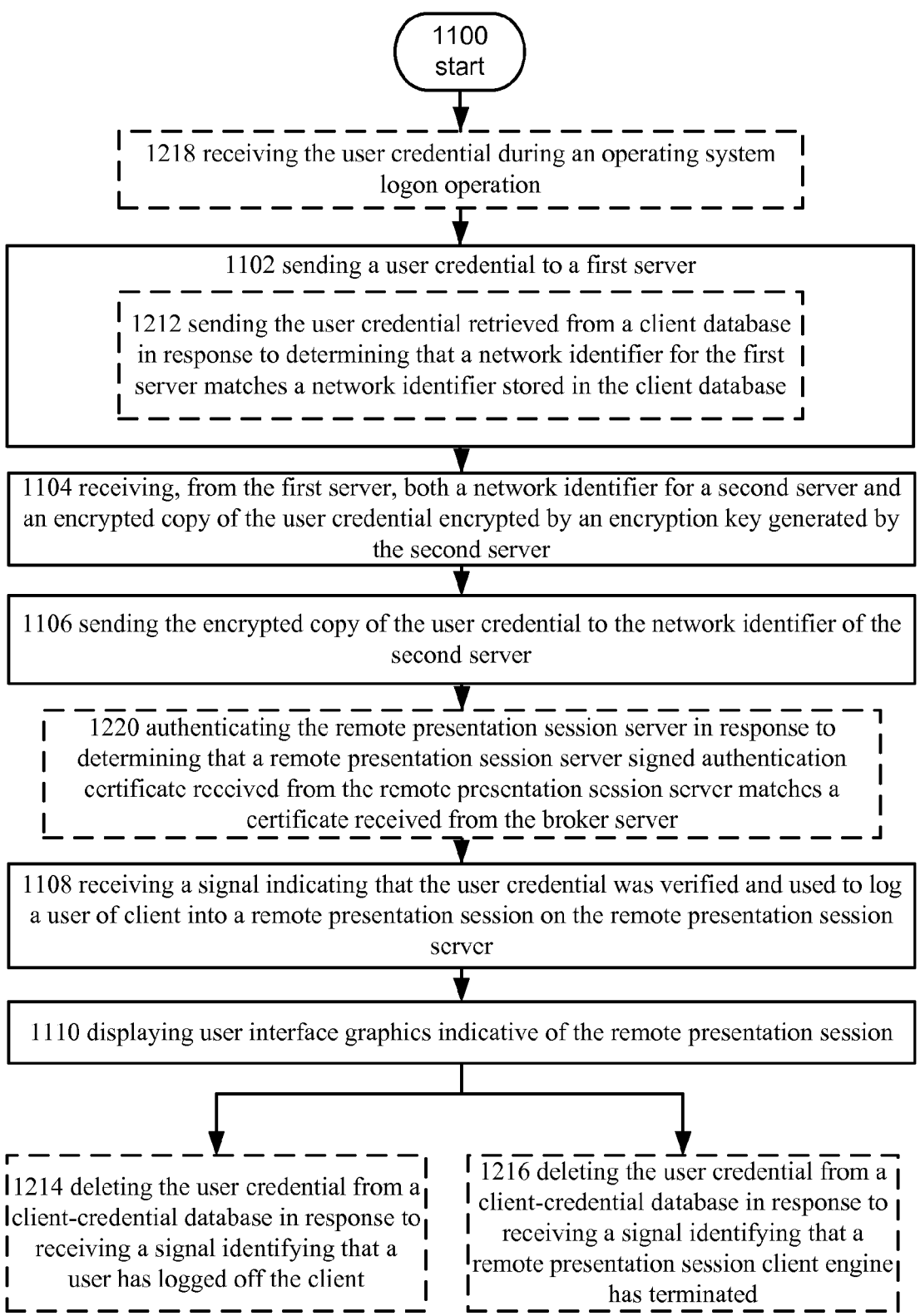
FIG. 12 depicts an alternative embodiment of the operational procedure of FIG. 11.

Referring now to FIG. 12, it illustrates an alternative embodiment of the operational procedure depicted in FIG. 11. FIG. 12 shows additional operations 1212, 1214, 1216, 1218, and 1220. Operation 1212 shows sending the user credential retrieved from a client database in response to determining that a network identifier for the first server matches a network identifier stored in the client database. For example, and turning to FIG. 6, in an exemplary embodiment client 624 can include client credential database 622. In this exemplary embodiment, credential database 622 can be configured to a reveal the user credential when a network identifier of broker server 608 matches a network identifier stored in credential database 622. For example, a user of client 624 may have previously connected to a website maintained by broker server 608 and may have logged into broker server 608. In this example, a client application may store a copy of the user credential used to log onto broker server 608 in credential database 622 along with, for example, the DNS name of broker server 608. During a subsequent log in operation, the application may issue a request to credential database 622 for a credential that is associated with broker server's network identifier and credential database 622 can check to see if it has a credential for the network identifier for broker server 608. Here, credential database 622 may have an identifier and may open a secure channel to the process that requested the credential and pass the credential.

Continuing with the description of FIG. 12, operation 1214 shows deleting the user credential from a client database in response to receiving a signal identifying that a user has logged off the client. For example, and turning to FIG. 6, in an exemplary embodiment credential database 622 can be configured to temporarily store user credentials and in this exemplary embodiment, credential database 622 can delete credentials upon logout. For example, when client 624 connects to broker server 608, the network identifier associated with broker server 608 and the user credential can be stored in credential database 622. The user credential can be used with any remote presentation session server associated with broker server 608 at this point. In this example, the database entry can be associated with information that indicates that it is a temporary user credential. In this example, when user logs off of operating system 618, credential database 622 can delete the user credential. In this exemplary embodiment, user credential can be stored in a secured repository instead of in RAM where it could potentially be captured by malicious software. For example, while client 624 is conducting a session with remote presentation session server 602, a copy of the user credential may be stored in RAM so that it can be presented to remote presentation session server 602 in the instance that there is a network glitch and client 624 was momentarily disconnected. In this example embodiment, the user credential can be stored in credential database 622 instead of in RAM. If a network glitch occurs in this example, remote presentation client 418 can query credential database 622 to send the user credential to the broker server 608, in order to get the encrypted credential for the remote presentation session server 602, and pass the network identifier for the broker server 608. In this example, credential database 622 can determine that it has a database entry that includes the network identifier for the broker server 608 and send the user credential associated with the network identifier to the broker server 608 along with the request to reconnect to the remote presentation session server 602. Upon receiving encrypted credentials for remote presentation session server 602, client 624 can send them to that server.

Continuing with the description of FIG. 12, operation 1216 shows deleting the user credential from a client database in response to receiving a signal identifying that a remote presentation session client engine has terminated. Similar to operation 1212, in an exemplary embodiment credential database 622 can be configured to temporarily store user credentials and in this exemplary embodiment, credential database 622 can delete user credentials when the process that stored the user credential is terminated. For example, when client 624 connects to remote presentation session server 602, remote presentation client 620 can request that the network identifier associated with remote presentation session server 602 and user credential can be stored in credential database 622. In this example, the database entry can be associated with information that indicates that it is a temporary user credential that should be deleted when remote presentation client 418 is terminated, i.e. operating system 618, marks threads of remote presentation client 418 for termination, frees any resources allocated by remote presentation client 418, removes remote presentation client 418, remote presentation client 418 exit code is set, etc. In this example, when user ends the remote presentation session and operating system 416 shuts down of remote presentation client 418, credential database 622 can delete the user credential.

Operation 1218 shows receiving the user credential during an operating system logon operation. For example, in an embodiment the user credential can be obtained when a user logs into operating system 618. Client 624 can display a login screen. A user can supply the user credential to the login screen and operating system 618 can pass the credentials to an authentication engine running on client 624 (not shown). The authentication engine in this example can verify the user credential and start a console session for the user. In addition, a copy of the user credential can be stored in, for example, credential database 622 until, for example, the user logs off operating system 618.

Turning now to operation 1220, it shows authenticating the second server in response to determining that a second server signed authentication certificate received from the second server matches a certificate received from the first server. For example, in an embodiment remote presentation session server 602 can be authenticated by using a self-signed certificate and the trust established between broker server 608 and client 624. Turning back to FIG. 6, certificate engine 404 running on remote presentation session server 602 can generate a certificate and sign it. For example, certificate engine 404 can generate a hash of the information in the certificate and encrypt the hash with a private encryption key and embed the encrypted hash in the certificate along with a public decryption key. The certificate can be sent to broker server 608, which can send the certificate to client 624. When client 624 connects to remote presentation session server 602, remote presentation session server 602 can send a copy of the certificate to client 624, which can compare the two certificates. In the instance that the certificates match, client 624 can authenticate remote presentation session server 602.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A system configured to effect single sign-on for remote presentation sessions, comprising:
   a first server, comprising:
   a first memory bearing instructions that, upon execution by a processor of the first server, cause the first server to at least:
   receive a user credential from a client computer;
   receive a unique encryption key from a second server;
   encrypt the user credential with the unique encryption key; and
   send the encrypted user credential to the client computer;
   a second memory bearing instructions that, upon execution by a processor of the second server, cause the second server to at least:
   generate the unique encryption key;
   send the unique encryption key to the first server;
   receive a copy of the encrypted user credential from the client computer;
   decrypt the copy of the encrypted user credential;
   log a user associated with the decrypted copy of the user credential into an operating system; and
   conduct the remote presentation session with the client computer.

2. The system of claim 1, further comprising:
   the client computer, comprising:
   a third memory bearing instructions that, upon execution by a processor of the client computer, cause the client computer to at least:
   retrieve the user credential from a client database and send the user credential to the first server in response to determining that a network identifier associated with the first server matches a network identifier stored in the client database.

3. The system of claim 1, further comprising:
   the client computer, comprising:
   a third memory bearing instructions that, upon execution by a processor of the client computer, cause the client computer to at least:
   authenticate the second server in response to determining that a second server signed authentication certificate received from the second server matches a certificate received from the first server.

4. The system of claim 1, wherein the second memory further bears instructions that, upon execution by a processor of the second server, cause the second server to at least:
   delete a decryption key for decrypting the copy of the encrypted user credential received from the client computer after a single use of the unique encryption key.

5. The system of claim 1, wherein the instructions that, upon execution by the processor of the first server cause the first server to at least encrypt the user credential received from the client computer with the unique encryption key further cause the first server to at least:
   encrypt the user credential and digitally sign a list of remote presentation session configuration settings.

6. The system of claim 1, wherein the first memory further bears instructions that, upon execution by a processor of the first server, cause the first server to at least:
   send a configuration profile to the client computer, wherein the configuration profile includes a network identifier associated with the first server.

7. The system of claim 1, wherein the second memory further bears instructions that, upon execution by a processor of the second server, cause the second server to at least:
   configure a guest operating system executing within a virtual machine to conduct a virtual desktop session with the client computer.

8. The system of claim 1, wherein the instructions that, upon execution by the processor of the second server, cause the second server to at least conduct the remote presentation session with the client computer further cause the second server to at least:
   conduct a remote desktop session with the client computer.

9. The system of claim 1, wherein the second memory further bears instructions that, upon execution by a processor of the second server, cause the second server to at least:

delete a decryption key for decrypting the copy of the encrypted user credential after a predetermined amount of time.

10. The system of claim 1, wherein the second memory further bears instructions that, upon execution by a processor of the second server, cause the second server to at least:

accept a connection request from the first server in response to a comparison between a network identifier of the first server and a network identifier stored in a second server registry.

11. A computer-readable storage device including executable instructions for effectuating single sign-on for a virtual desktop session, the computer-readable storage medium including computer-executable instructions that cause a processor of a first server to at least:

generate an encryption key and associate it with a unique identifier;

send both the encryption key and the unique identifier to a second server configured to encrypt a copy of a user credential with the encryption key;

receive an encrypted copy of the user credential and the unique identifier from a client computer;

decrypt the encrypted copy of the user credential in response to finding a decryption key that is associated with the unique identifier;

log a user associated with the user credential into a virtual desktop session; and conduct the virtual desktop session with the client computer.

12. The computer-readable storage device of claim 11, further comprising computer-executable that cause the processor of the first server to at least:

verify a signature of a list of virtual desktop configuration settings received from the client computer with the encryption key; and configure the virtual desktop session in accordance with the list of virtual desktop configuration settings.

13. The computer-readable storage device of claim 11, further comprising computer-executable that cause the processor of the first server to at least:

delete a decryption key for decrypting the copy of the encrypted user credential received from the client computer after a predetermined amount of time.

14. The computer-readable storage device of claim 11, further comprising computer-executable that cause the processor of the first server to at least: accept a connection request from the second server in response to a comparison between a network identifier of the second server and a stored network identifier stored in a first server registry.

15. A single sign on method, comprising:

sending, by one or more computers, a user credential to a first server;

receiving, by the one or more computers, and from the first server, both a network identifier for a second server and an encrypted copy of the user credential encrypted by an encryption key generated by the second server;

sending, by the one or more computers, the encrypted copy of the user credential to the network identifier of the second server;

receiving, by the one or more computers, a signal indicating that the user credential was verified and used to log a user of the client into a remote presentation session on the second server; and displaying, by the one or more computers, user interface graphics indicative of the remote presentation session.

16. The method of claim 15, wherein sending the user credential to the first server further comprises:

sending the user credential retrieved from a client database in response to determining that a network identifier for the first server matches a network identifier stored in the client database.

17. The method of claim 15, further comprising:

deleting the user credential from a client database in response to receiving a signal identifying that a user has logged off the client computer.

18. The method of claim 15, further comprising:

deleting the user credential from a client database in response to receiving a signal identifying that a remote presentation session client engine has terminated.

19. The method of claim 15, further comprising:

receiving the user credential during an operating system logon operation.

20. The method of claim 15, further comprising:

authenticating the second server in response to determining that a second server signed authentication certificate received from the second server matches a certificate received from the first server.

* * * * *